US011628913B2

(12) United States Patent
Merriam

(10) Patent No.: US 11,628,913 B2
(45) Date of Patent: Apr. 18, 2023

(54) ENTERTAINMENT BARGE

(71) Applicant: Jamison E. Merriam, Acton, MA (US)

(72) Inventor: Jamison E. Merriam, Acton, MA (US)

( * ) Notice: Subject to any disclaimer, the term of this patent is extended or adjusted under 35 U.S.C. 154(b) by 0 days.

(21) Appl. No.: 16/911,750

(22) Filed: Jun. 25, 2020

(65) Prior Publication Data

US 2020/0407029 A1 Dec. 31, 2020

Related U.S. Application Data

(60) Provisional application No. 62/868,292, filed on Jun. 28, 2019.

(51) Int. Cl.
| | | |
|---|---|---|
| *B63B 35/28* | (2006.01) | |
| *B63B 29/14* | (2006.01) | |
| *B63B 29/02* | (2006.01) | |
| *B63B 29/04* | (2006.01) | |
| *B63B 29/20* | (2006.01) | |
| *B63H 21/12* | (2006.01) | |
| *B63B 1/10* | (2006.01) | |

(52) U.S. Cl.
CPC ................ *B63B 35/28* (2013.01); *B63B 1/10* (2013.01); *B63B 29/025* (2013.01); *B63B 29/04* (2013.01); *B63B 29/14* (2013.01); *B63B 29/20* (2013.01); *B63H 21/12* (2013.01); *B63B 2029/043* (2013.01)

(58) Field of Classification Search
CPC ... B63B 35/28; B63B 35/34; B63B 2035/442; B63B 1/10; B63B 29/025; B63B 29/04; B63B 29/14; B63B 29/20; B63B 2029/043; B63H 21/17; B63H 35/28; B63H 21/12

See application file for complete search history.

(56) References Cited

U.S. PATENT DOCUMENTS

| | | | | |
|---|---|---|---|---|
| 4,064,584 A | * | 12/1977 | Funkhouser | B63B 3/48 |
| | | | | 114/343 |
| 4,073,078 A | * | 2/1978 | Leitz | E02F 3/905 |
| | | | | 114/294 |
| 4,254,730 A | * | 3/1981 | Crenshaw | B63B 21/50 |
| | | | | 114/294 |
| 4,981,100 A | * | 1/1991 | Bergeron | B63C 13/00 |
| | | | | 114/344 |
| 5,742,956 A | * | 4/1998 | Tarver | A47K 4/00 |
| | | | | 4/644 |
| 9,908,590 B2 | * | 3/2018 | Foster | B63B 43/14 |
| 2011/0132250 A1 | * | 6/2011 | Nelson | E04H 1/04 |
| | | | | 114/266 |

* cited by examiner

*Primary Examiner* — Stephen P Avila
(74) *Attorney, Agent, or Firm* — Michael J. Persson; Catherine Napjus; Chisholm, Persson & Ball, PC

(57) ABSTRACT

An entertainment barge includes at least two pontoons, a first deck having a front, rear, right side and left side, is attached to both pontoons. A second deck is disposed above and substantially parallel to the first deck. At least two retractable spuds are attached to the deck and are adapted to be lowered into the water to secure the barge in a fixed position.

22 Claims, 13 Drawing Sheets

ENTERTAINMENT BARGE

CLAIM OF PRIORITY

This application claims the benefit of priority of U.S. Provisional Patent Application Ser. No. 62/868,292, filed on Jun. 28, 2019.

FIELD OF THE INVENTION

The present invention relates to barges and, in particular to a barge adapted for use as a floating entertainment venue.

BACKGROUND OF THE INVENTION

Boating is a popular recreational activity. For many people, their boat is where they spend most of their weekend and vacation hours during the summer and it is not uncommon for boaters to cast off in the morning and not return to dock until after dark. Traditionally, boaters have either needed to pack a cooler with food and beverages for the day or return to shore, dock their boat, and have a meal. This is not ideal, as packed coolers are heavy, require advanced planning, and limit the boater's options to foods that can be eaten cold. Returning to shore is also not ideal, as this takes time and fuel and requires the boater to find a place to dock. Further, if the boater is moored in a popular location, like a sandbar, leaving creates the risk of not being able to find a suitable mooring location upon their return. Therefore, there is a need to provide a vessel that is capable of providing food and drink to boaters at their location on the water.

Floating concession boats are known in the art and these boats will typically travel around a lake or other body of water and deliver food to boaters. However, these boats have significant drawbacks. First, they are not stationary and run the risk of running into and damaging their customers' boats when pulling alongside to deliver food. Second, they are not designed to allow their customers to come on-board to eat, have a drink or use the toilet. Finally, even if there was a way for customers to come on-board, there is no way to steady the boat to prevent the risk of customers spilling drinks or falling, let alone providing entertainment like dancing. Therefore, there is a need for a vessel that can provide food and drink to boaters at their location on the water, which does not risk running into and damaging their customers' boats, that is designed to allow their customers to come on-board to eat, have a drink or use the toilet, and provides a stable deck surface that reduces the risk of customers spilling drinks or falling and allows for the provision of entertainment like dancing.

SUMMARY OF THE INVENTION

The present invention is an entertainment barge that is designed to provide food and drink to boaters at their location on the water, does not risk running into and damaging their customers' boats, is designed to allow their customers to come on-board to eat, have a drink or use the toilet, and provides a stable deck surface that reduces the risk of customers spilling drinks or falling as well as allowing for the provision of entertainment like dancing.

In one embodiment, the entertainment barge includes at least two pontoons, preferably made of steel. A first deck having a front, rear, right side and left side, is attached to both pontoons. A second deck is disposed above and substantially parallel to the first deck. At least two, and preferably three, retractable spuds are attached to the deck and are adapted to be lowered into the water to secure the barge in a fixed position. Unlike in traditional spud barges, the preferred spuds do not raise the pontoons from the water but, rather, allow the barge to remain floating but in a substantially fixed position. As such, the spuds and the pontoons are "independent" of one another. As used herein, "independent" means that, while each is an element of the barge of the present invention, the operations of the spuds and pontoons do not affect one another. Importantly, "independent" means that whether the spuds are in a raised position, a fixed position, or moving between the raised and fixed positions, the pontoons remain floating and unaffected and the barge may continue to move in a vertical direction. Each spud is connected to a winch, which is used to raise the spud when the barge is set to be moved. Although the preferred embodiments of the entertainment barge include spuds, some embodiments of the entertainment barge of the present invention do not include spuds.

The preferred entertainment barge includes at least one, and preferably two, swim ladders mounted to at least one side of the first deck. The preferred swim ladders are rotatably mounted to the deck using rotatable mounts, preferably sealed barrel type hinges. Each includes an inclined ladder portion, which is two struts with a plurality of stairs extending therebetween, a pair of hand railings fixed to the ladder portion, and a pair of deck braces that connect the ladder portion to the rotating mounts. The deck braces are shaped and dimensioned such they extend past the edge of the deck when the ladder is in a deployed position and secure the ladder to allow people to swim to the barge and climb up the ladder portion onto the deck. When the preferred ladders are not in use, they are rotated upward such that the hand railings rest on the first deck and an anti-rotation pin is thereafter inserted in to the rotatable mount to prevent rotation of the ladder while in its stored position. Some embodiments of the entertainment barge include a retractable awning spanning substantially the entire length of the second deck. The retractable awning includes a first base portion and a second base portion that are secured together and supported by a central post that extends perpendicularly from the second deck. It is understood that in some embodiments, there is only a single base portion supported by the central post. Each base portion has a top, a bottom, and right base portion side, and a left base portion side from which a series of hinged spring-loaded retractable arms are attached. The base portions and arms are shaped and dimensioned such that the arms retract into to the base portion when the awning is in a fully retracted position. An awning roller is preferably also disposed within and extends the combined length of each side of the first and second base portion and is adapted to secure an awning fabric when retracted and to allow the awning fabric to be extended when the awning is in an extended position. Each side of the first and second base portion preferably includes its own roller and awning fabric. Each awning roller is preferably attached to and controlled by a motor that rotates one way to retract the awning fabric and another way to allow it to be extended. The motor is preferably controlled by both a wireless remote and a wind sensor, which senses when the wind exceeds a predetermined threshold and partially or fully retracts the awning in response to thereto.

The preferred entertainment barge includes at least one main propulsion motor mounted on the rear of the first deck, as well as an adjustment motor mounted to a corner of the first deck. The adjustment motor is adapted to allow the barge to be maneuvered into a desired position either for docking or for setting the spuds at a desired location upon a body of water.

The main propulsion motor is preferably a pair of main propulsion motors mounted in tandem to a motor lift system. The motor lift system includes a frame having a pair of vertical supports fixedly attached to the rear of the first deck, and an upper cross bar that extends between the vertical supports, wherein the vertical supports are each U-shaped and include an inward facing channel. A lower mounting bar is include and is shaped and dimensioned to fit within the channels of the vertical supports such that the lower mounting bar may move in a vertical direction but may not move in a horizontal direction and to allow the at least one propulsion motor to be mounted thereto. A pair of hydraulic cylinders are attached to the cross bar of the frame and the lower mounting bar in substantially parallel relation to the vertical supports. The hydraulic cylinders are adapted to move the lower mounting bar vertically upward and downward within the vertical supports a distance of between two feet and four feet.

The preferred entertainment barge also includes at least one docking guide that is shaped and dimensioned to engage with a docking post. The preferred docking guide is mounted to the front of the barge and includes an inward "V" shaped notch. The docking post is preferably a square post the extends with one edge of facing outward to mate with the "V" shaped notch in the docking guide. When so mated, the docking post and guide prevent rotation of the barge.

The preferred entertainment barge has a modular design with its kitchen and bathrooms being mounted to the first deck in fully assembled form. As used herein, the term "modular" is understood to mean that the kitchen and bathrooms are fully assembled before being integrated onto the deck through mounting. The preferred kitchen takes the form of a mobile food trailer with the wheels removed therefrom. The kitchen preferably includes all necessary equipment and storage to meet food service regulations and also includes a drive-up window to allow other boats to pull up to the barge and order and be served food from the barge. The modular bathrooms are piped into a holding tank disposed below the first deck between the pontoons.

Finally, the preferred entertainment barge also includes a swim bar rotatably mounted to the deck using rotatable mounts, preferably sealed barrel type hinges, attached to one side of the first deck. The swim bar is adjustable between a downward position when patrons may enjoy the bar and an upward position when the swim bar is rotated onto the first deck and the barge is moving. The swim bar includes a plurality of seats and a bar surface upon which patrons may rest their drinks. When secured at a desired location, the swim bar is rotated downward into the water into downward position and is preferably secured by two cables that are sized to maintain the bar surface in substantially parallel relation to the first deck. As used herein, it is understood that "substantially parallel" may encompass small variations away from perfect parallel positioning, as well as perfect parallel positioning. When the entertainment barge is to be moved from its location, the swim bar is rotated upward out of the water into upward position and is secured in a manner similar to the swim ladders discussed above.

Therefore, it is an aspect of the invention to provide an entertainment spud barge that is designed to provide food and drink to boaters at their location on the water.

It is a further aspect of the invention to provide an entertainment spud barge that does not risk running into and damaging their customers' boats.

It is a further aspect of the invention to provide an entertainment spud barge that is designed to allow their customers to come on-board to eat, have a drink or use the toilet.

It is a further aspect of the invention to provide an entertainment spud barge that provides a stable deck surface that reduces the risk of customers spilling drinks or falling as well as allowing for the provision of entertainment like dancing.

It is a further aspect of the invention to provide an entertainment spud barge that utilizes a modular kitchen.

It is a further aspect of the invention to provide an entertainment spud barge that includes a drive through window.

It is a further aspect of the invention to provide an entertainment spud barge that includes a self-contained modular bathroom with holding tanks.

It is a further aspect of the invention to provide an entertainment spud barge that includes hinged ladders that may be lowered into the water to allow customers to climb on-board.

It is a further aspect of the invention to provide an entertainment spud barge that includes a retractable awning that may be easily opened and closed.

It is a further aspect of the invention to provide an entertainment spud barge that includes an adjustment motor.

It is a further aspect of the invention to provide an entertainment spud barge that includes a docking guide.

It is a still further aspect of the invention to provide an entertainment spud barge that includes a swim bar that may be lowered into the water to allow customers to sit at the bar while in the water.

These aspects of the invention are not meant to be exclusive and other features, aspects, and advantages of the present invention will be readily apparent to those of ordinary skill in the art when read in conjunction with the following description, appended claims and accompanying drawings.

DETAILED DESCRIPTION OF THE INVENTION

Figure 1A:
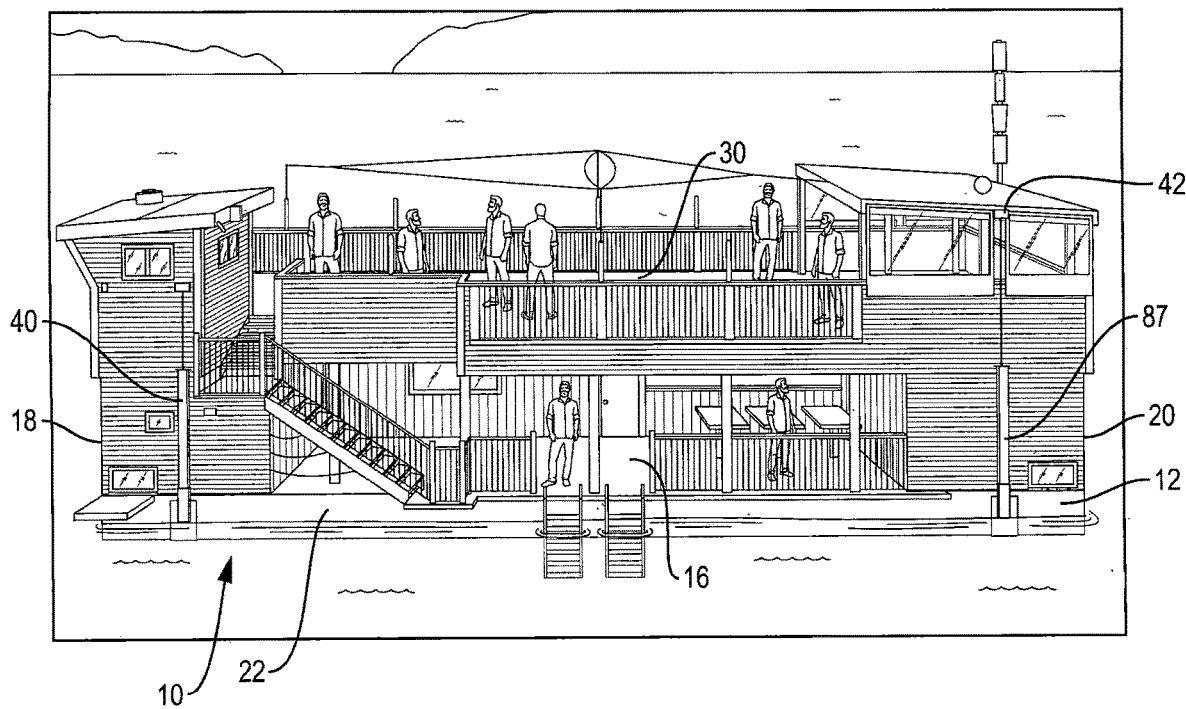
FIG. 1A is a right side perspective view of one embodiment of the entertainment barge of the present invention.
Figure 1B:
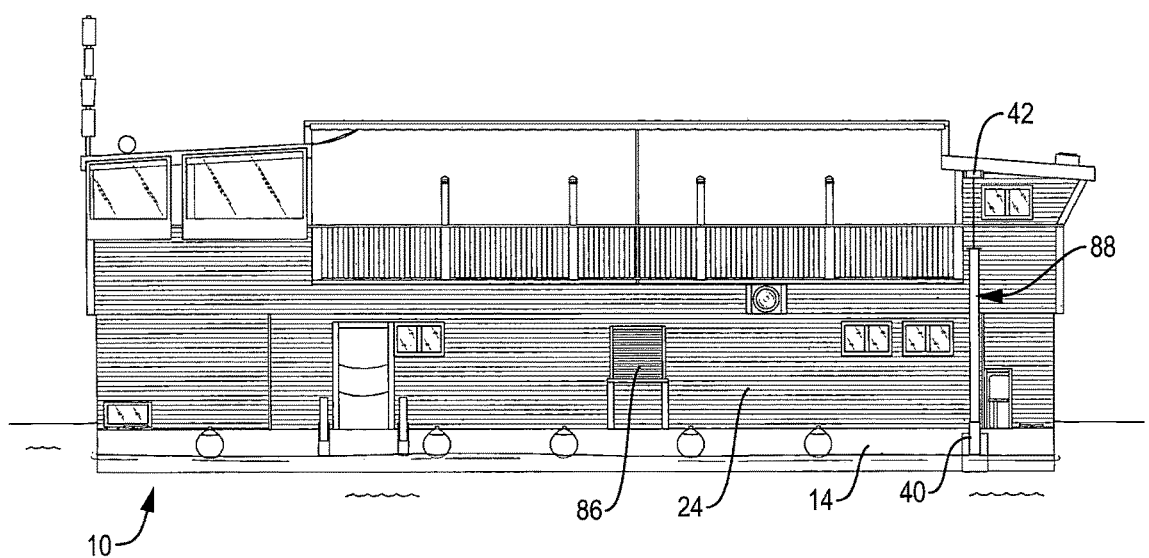
FIG. 1B is a left side perspective view of one embodiment of the entertainment barge of the present invention.

Referring first to FIGS. 1A and 1B, the entertainment barge 10 includes at least two pontoons 12, 14. A first deck 16 having a front 18, rear 20, right side 22 and left side 24, is attached to both pontoons 12, 14. A second deck 30 is disposed above and substantially parallel to the first deck 16. At least two, and preferably three, retractable spuds 40 are attached to the sides 22, 24 of the first deck and are adapted to be lowered into the water to secure the barge 10 in a fixed position. Each spud 40 is connected to a winch 42, which is used to raise the spud 40 when the barge 10 is set to be moved. As shown in FIG. 1A, spuds 40 are in fixed position 87, where barge 10 is stabilized in place. As shown in FIG. 1B, spud 40 is in raised position 88, where barge 10 may freely move about. Unlike in traditional spud barges, the preferred spuds 40 do not raise the pontoons 12, 14 from the water but, rather, allow the barge 10 to remain floating whether spuds 40 are in fixed position 87 or raised position 88. As such, spuds 40 and pontoons 12, 14 are independent of one another.

Figure 2A:
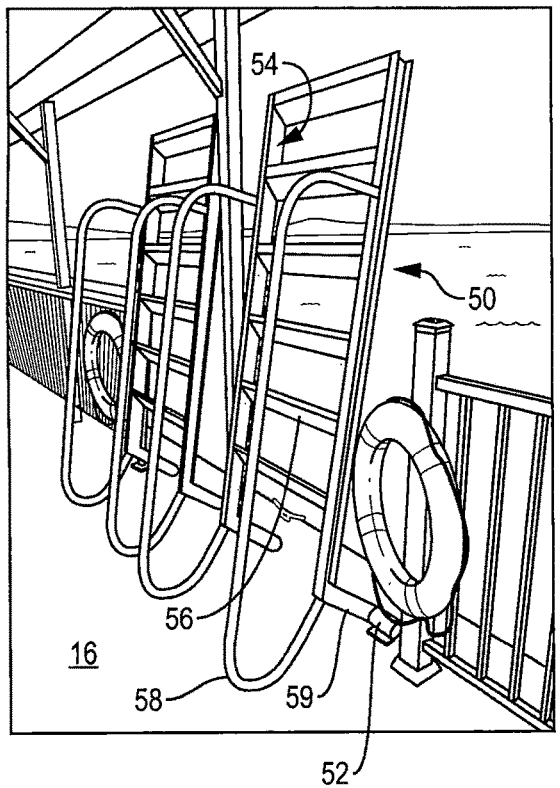
FIG. 2A is a rear perspective view of one embodiment of the swim ladders of the entertainment barge of the present invention in a stored position.
Figure 2B:
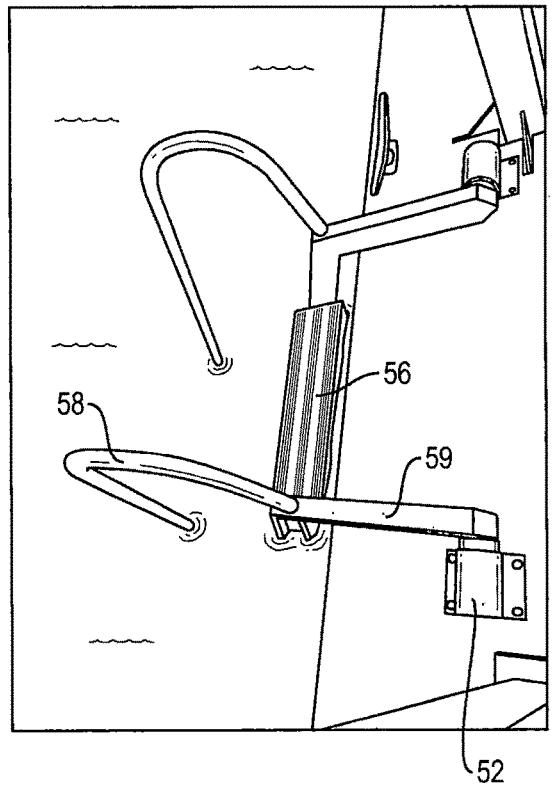
FIG. 2B is a top perspective view of the embodiment of one of the swim ladders of FIG. 2A in a deployed position.

Referring next to FIGS. 2A and 2B, the preferred entertainment barge 10 includes at least one, and preferably two, swim ladders 50 mounted to at least one side of the first deck 16. The preferred swim ladders 50 are rotatably mounted to the deck 16 using ladder rotatable mounts 52, preferably sealed barrel type hinges. Each swim ladder 50 includes inclined struts 54 having a plurality of stairs 56 set between struts 54, a pair of hand railings 58 fixed to the ladder portion 54, and a pair of deck braces 59 that connect the ladder portion 54 to the ladder rotating mounts 52. The deck braces 59 are shaped and dimensioned such they extend past the edge of the first deck 16 when the ladder 50 is in a deployed position and secure the ladder 50 to allow people to swim to the barge 10 and climb up the ladder portion 54 onto the first deck 16. When the preferred ladders 50 are not in use, they are rotated upward such that the hand railings 58 rest on the first deck 56 and an anti-rotation pin (not shown) is thereafter inserted in to the rotatable mount 52 to prevent rotation of the ladder 50 while in its stored position.

Figure 3A:
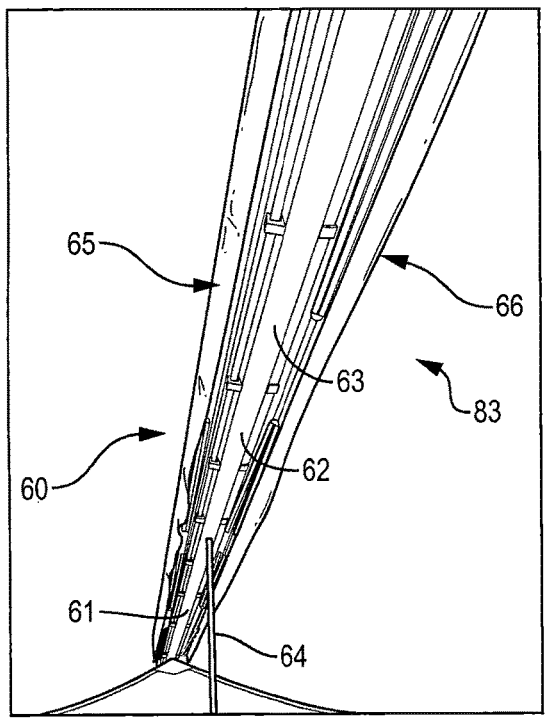
FIG. 3A is a bottom perspective view of one embodiment of the retractable awning of the entertainment barge of the present invention in a stored position.
Figure 3B:
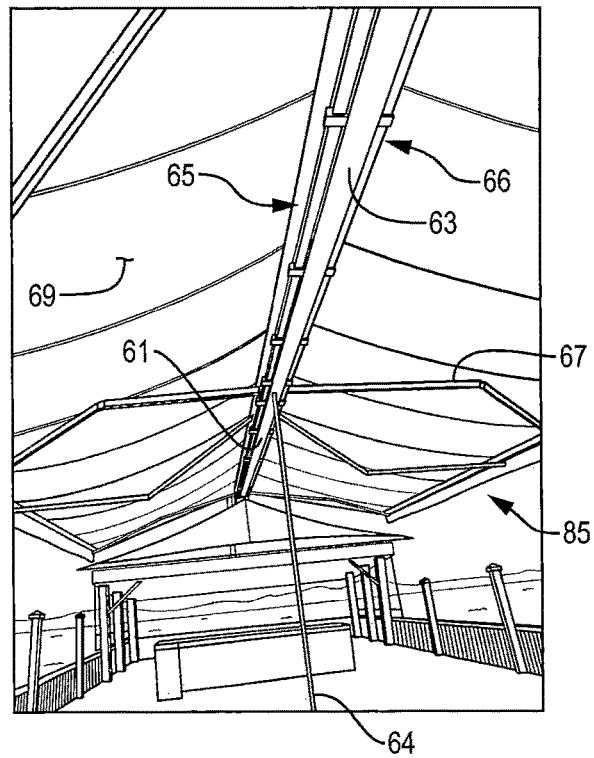
FIG. 3B is a top perspective view of the embodiment of the retractable awning of FIG. 3A in a deployed position.

Referring now to FIGS. 3A and 3B, some embodiments of the entertainment barge 10 include a retractable awning 60 spanning substantially the entire length of the second deck 30. The retractable awning 60 includes a first base portion 61 and a second base portion 63 that are secured together and supported by a central post 64 that extends perpendicularly from second deck 30. Each base portion 61, 63 has a top (not shown), a bottom 62 and two sides 65, 66 from which a series of hinged spring-loaded retractable arms 67 are attached. The base portions 61, 63 and arms 67 are shaped and dimensioned such that the arms 67 retract into the base portions 61, 63 when the awning 60 is in a fully retracted position 83. An awning roller (not shown) is preferably also disposed within and extends the combined length of each side 65, 66 of the first and second base portion 61, 63 and is adapted to secure an awning fabric 69 when retracted and to allow the awning fabric 69 to be extended when the awning 60 is extended position 85. Each side 65, 66 of the first and second base portion 61, 63 preferably includes its own roller and awning fabric 69. Each awning roller is preferably attached to and controlled by a motor (not shown) that rotates one way to retract the awning fabric 69 and another way to allow it to be extended. The motor is preferably controlled by both a wireless remote (not shown) and a wind sensor (not shown), which senses when the wind exceeds a predetermined threshold and partially or fully retracts the awning in response to thereto.

Figure 9A:
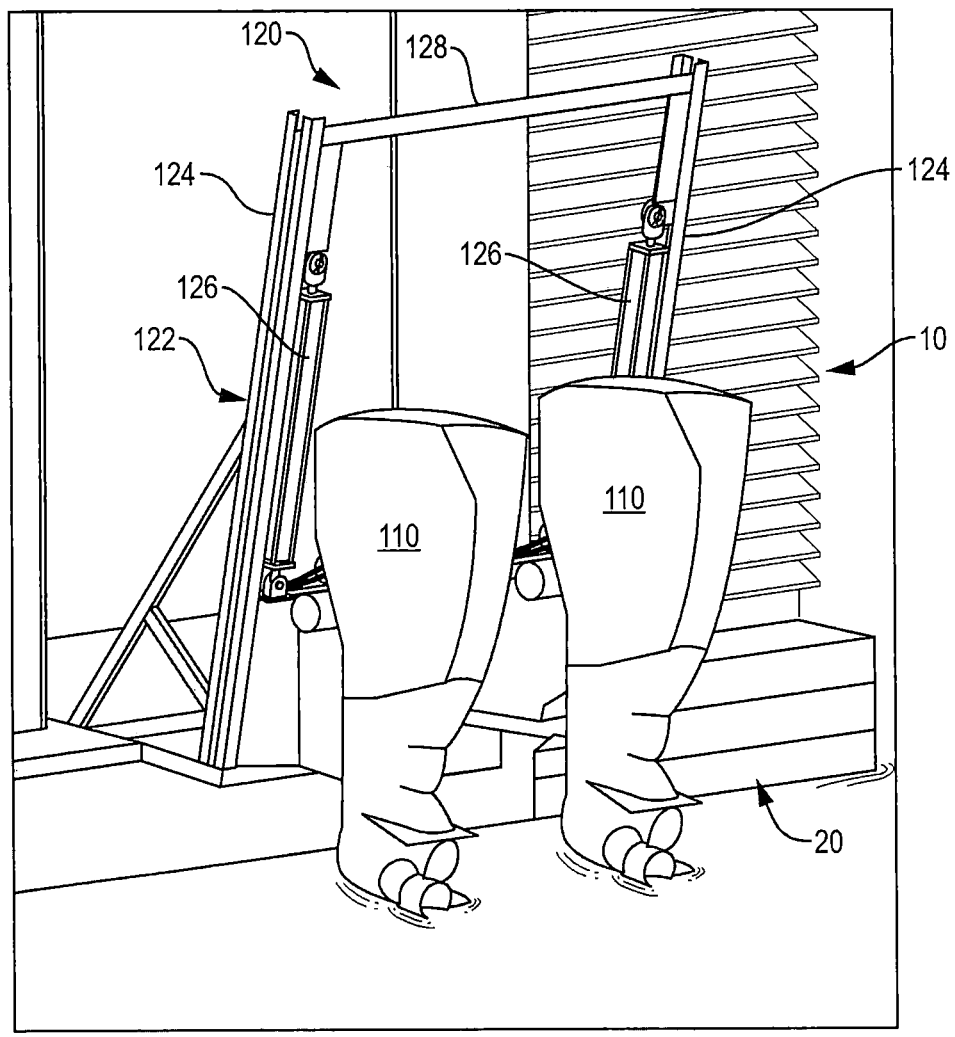
FIG. 9A is a rear perspective view of the entertainment barge of the present invention showing the propulsion motors mounted to the motor lift system of the present invention.
Figure 9B:
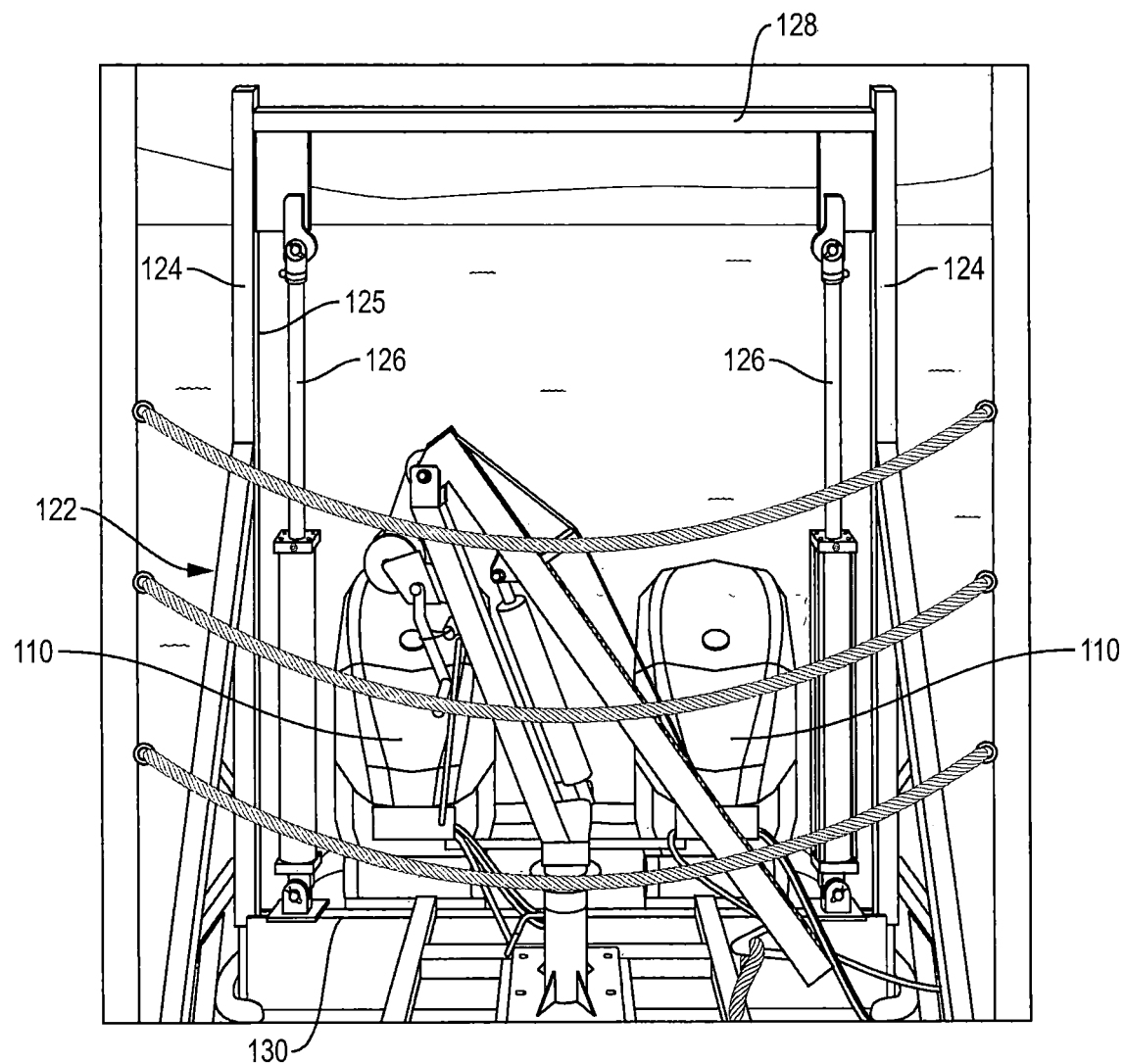
FIG. 9B is a rear perspective view of the propulsion motors and motor lift system of FIG. 9A.
Figure 9C:
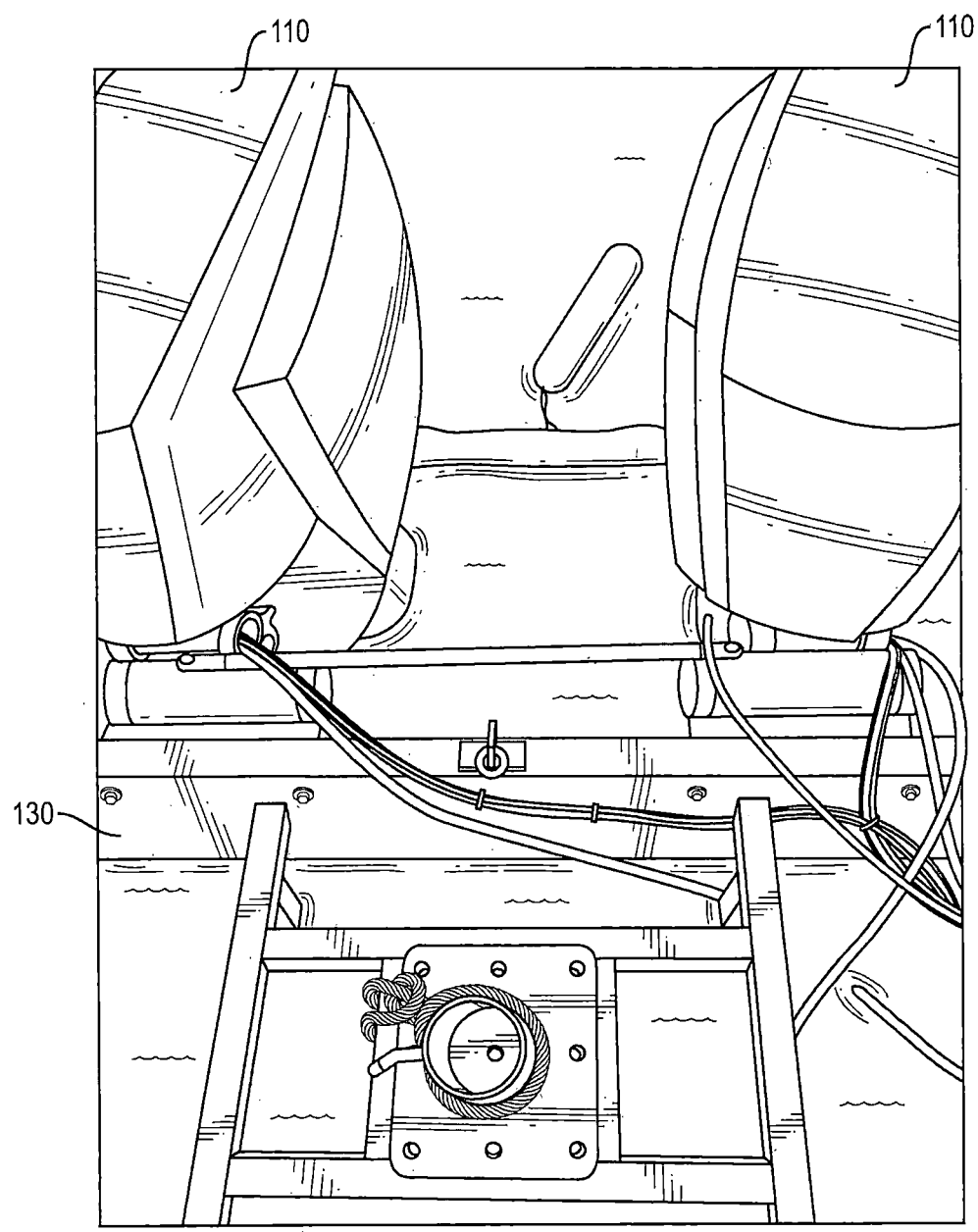
FIG. 9C is a top perspective view of the propulsion motors and motor lift system of FIGS. 9A and 9B.

Referring now to FIGS. 9A-9C, the preferred propulsion motors 110 and motor lift system 120 are shown. The preferred propulsion motors 110 are outboard type motors of a type commonly used in inland marine applications. In some embodiments, one or two propulsion motors 100 are attached in a substantially fixed position at the rear 20 of the barge 10 and operates in the same manner as conventional outboard type motors insofar as it is rotatable side to side to effectuate steering and is likewise rotatable upward to raise the propeller in the water when entering shallow water. However, outboard type motors that are conventionally mounted does not allow for the depth of the propellers to be increased or decreased depending on the load on the barge 10, are difficult to service and, when tilted, the propellers are still located below the surface of the water, are not readily visible, and may create a hazard to people swimming in close proximity to the motors. Accordingly, it is preferred that the propulsion motors 110 be mounted to the motor lift system 120 of the present invention.

The motor lift system 120 of the present invention includes a frame 122 that includes a pair of vertical supports 124 fixedly attached to the rear 20 of the barge 10, and an upper cross bar 128 that extends between the vertical supports 124. The vertical supports 124 are preferably U-shaped and have channels 125 formed by the U-shape facing inward towards each other. A lower mounting bar 130 is shaped and dimensioned to fit within the channels 125 such the lower mounting bar 130 may move in a vertical direction but may not move horizontally. The propulsion motors 110 are mounted to the lower mounting bar 130 in the same manner as they would be if they were conventionally mounted to the rear of a vessel, but are wired to allow for upward travel of the motors 110 when lifted. A pair of hydraulic cylinders 126 are attached to the cross bar 128 and the lower mounting bar 130 in substantially parallel relation to the vertical supports 124. The hydraulic cylinders 126 are in fluid communication with a fluid pump (not shown) that pumps hydraulic fluid into and out of each of the hydraulic cylinders 126 at substantially the same rate so as to move the lower mounting bar 130 upward and downward within the vertical supports 124 as desired. As shown in FIG. 9A, the hydraulic cylinders 126 are capable of raising the propulsion motors 110 vertically a distance of up to four feet so that the propellers 138 are at least partially visible above the surface 140 of the water. The motor lift system 120 of the present invention may be readily adapted for use with a variety of barges, both with and without spuds, as well as other types of vessels.

Figure 4:
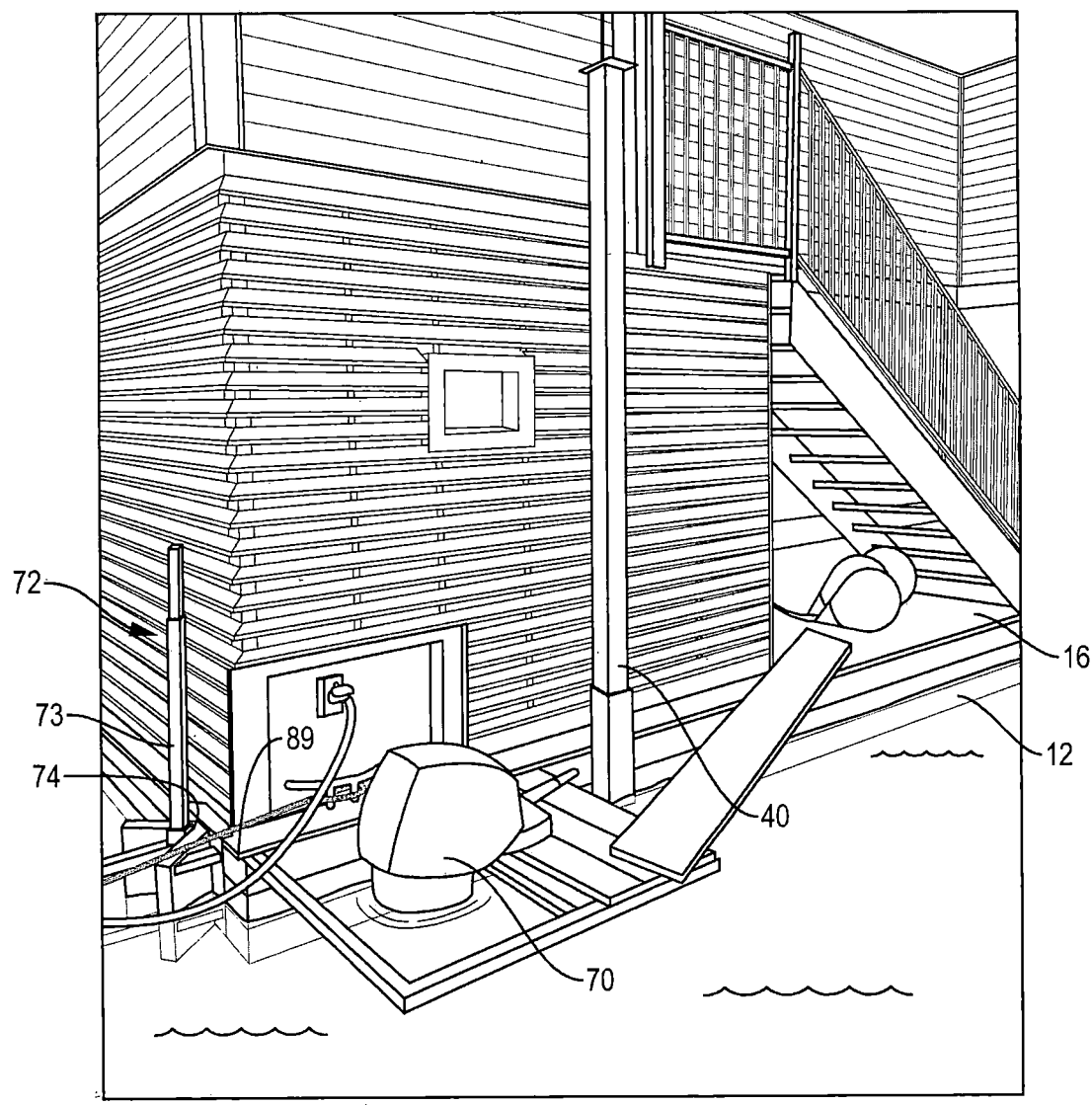
FIG. 4 is a right side perspective view of the rear of the entertainment barge of the present invention showing a spud, the adjustment motor, and the docking guide.

Referring now to FIG. 4, the preferred entertainment barge 10 includes at least one adjustment motor 70 mounted to a corner 89 of the first deck 16. The adjustment motor 70 is mounted in a different direction from the main propulsion motor 84 to allow the barge 10 to be maneuvered into a desired position either for docking or for setting the spuds 40 at a desired location upon a body of water.

Figure 5:
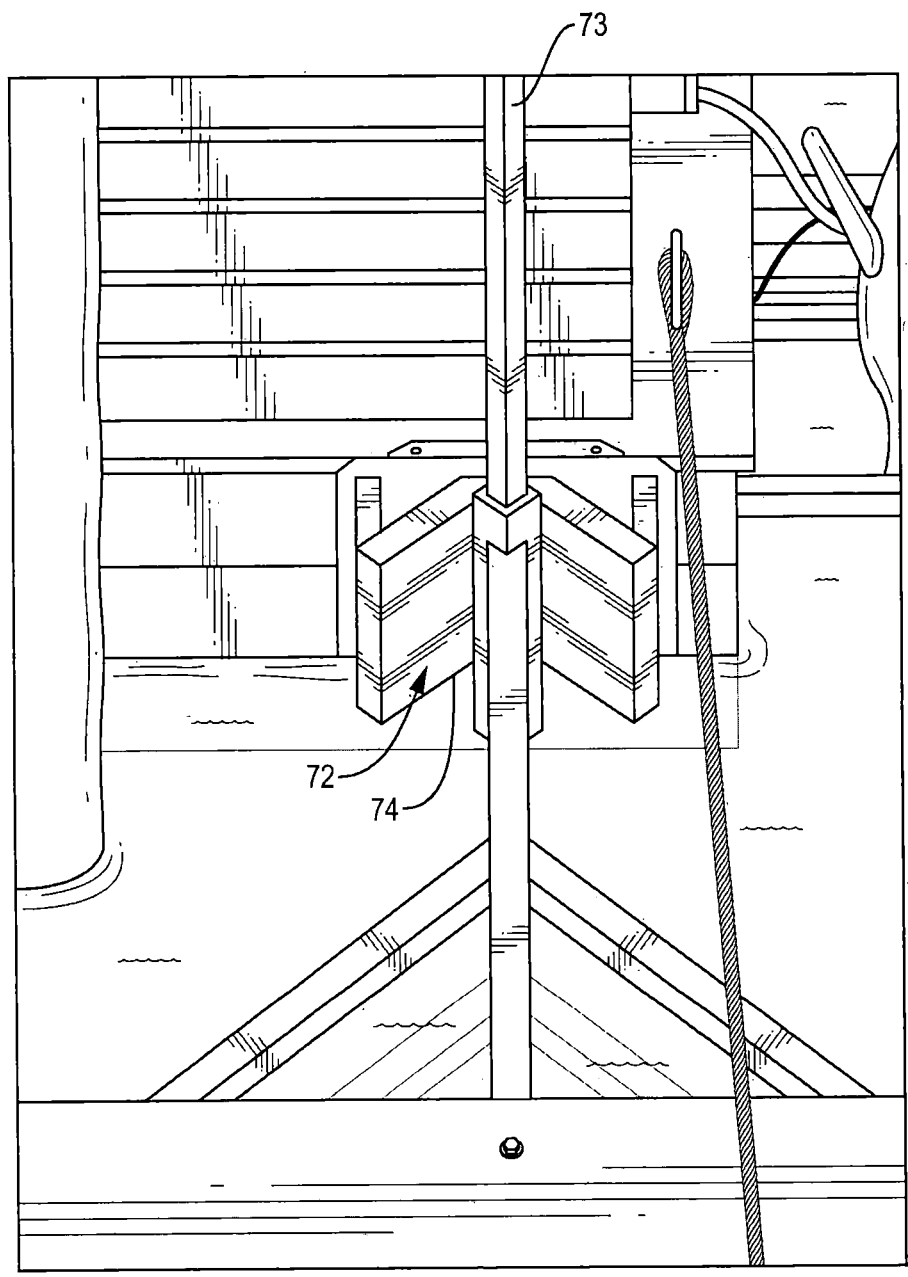
FIG. 5 is a perspective view of the docking guide of the entertainment barge of the present invention engaged with a docking post.

Referring now to FIG. 5, the preferred entertainment barge 10 also includes at least one docking guide 72 that is shaped and dimensioned to engage with a docking post 73. The preferred docking guide 72 is mounted to the front of the barge 10 and includes an inward "V" shaped notch 74. The docking post 73 is preferably a square post the extends with one edge facing outward to mate with the "V" shaped notch 74 in the docking guide 72. When so mated, the docking post 73 and guide 72 prevent rotation of the barge 10.

Figure 6:
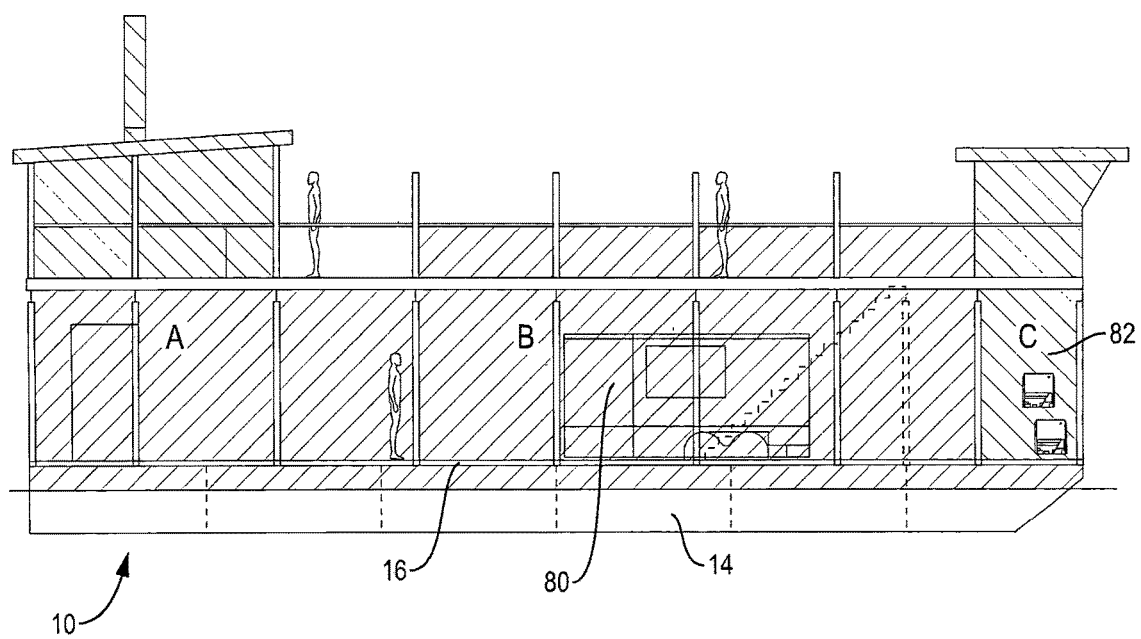
FIG. 6 is a cut away right side perspective view of one embodiment of the entertainment barge of the present invention showing the modular kitchen and modular bathrooms.
Figure 7A:
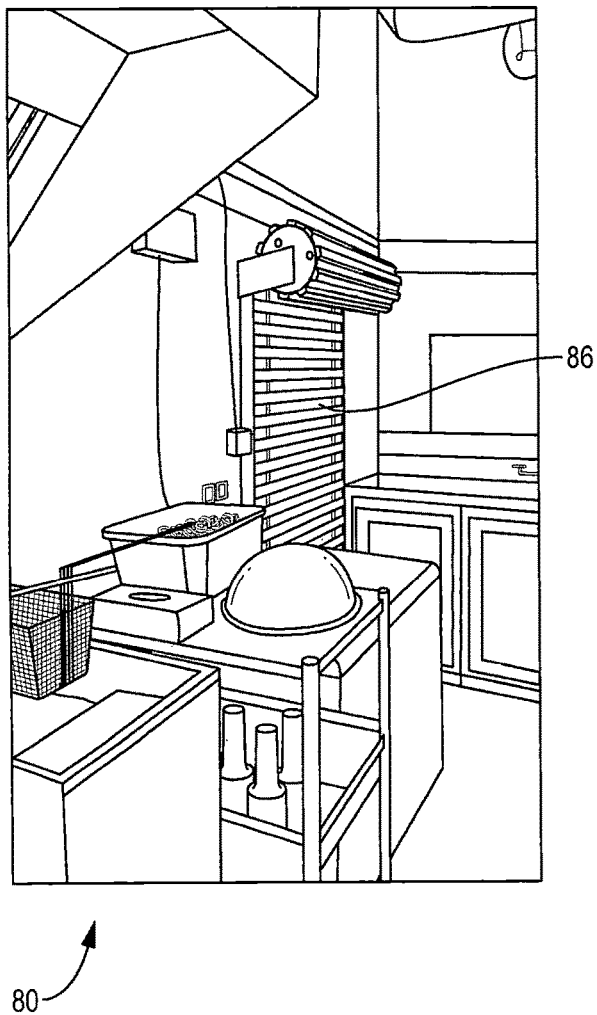
FIG. 7A is a side perspective view of one embodiment of the modular kitchen of the entertainment barge of the present invention showing the drive-up window.
Figure 7B:
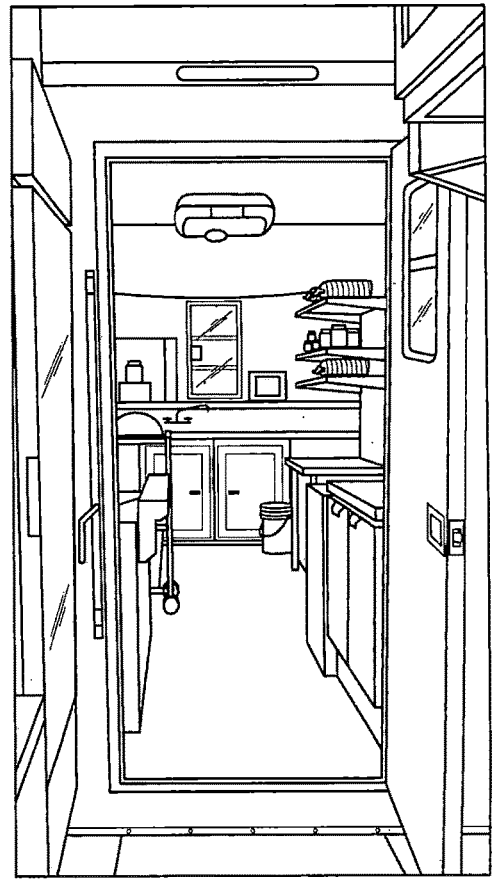
FIG. 7B is a front perspective view of the embodiment of the modular kitchen of FIG. 7A.

Referring now to FIG. 6, the preferred entertainment barge 10 has a modular design with its kitchen 80 and bathrooms 82 being mounted to the first deck 16 in fully assembled form. The preferred kitchen 80 takes the form of a mobile food trailer with the wheels removed therefrom. As shown in FIGS. 7A and 7B, the kitchen 80 preferably includes all necessary equipment and storage to meet food service regulations and also includes a drive-up window 86, which is also shown in FIG. 1B, to allow other boats to pull up to the barge 10 and order and be served food from the barge. The modular bathrooms 82 are piped into a holding tank (not shown) disposed below the first deck 16 between the pontoons 12, 14.

Figure 8A:
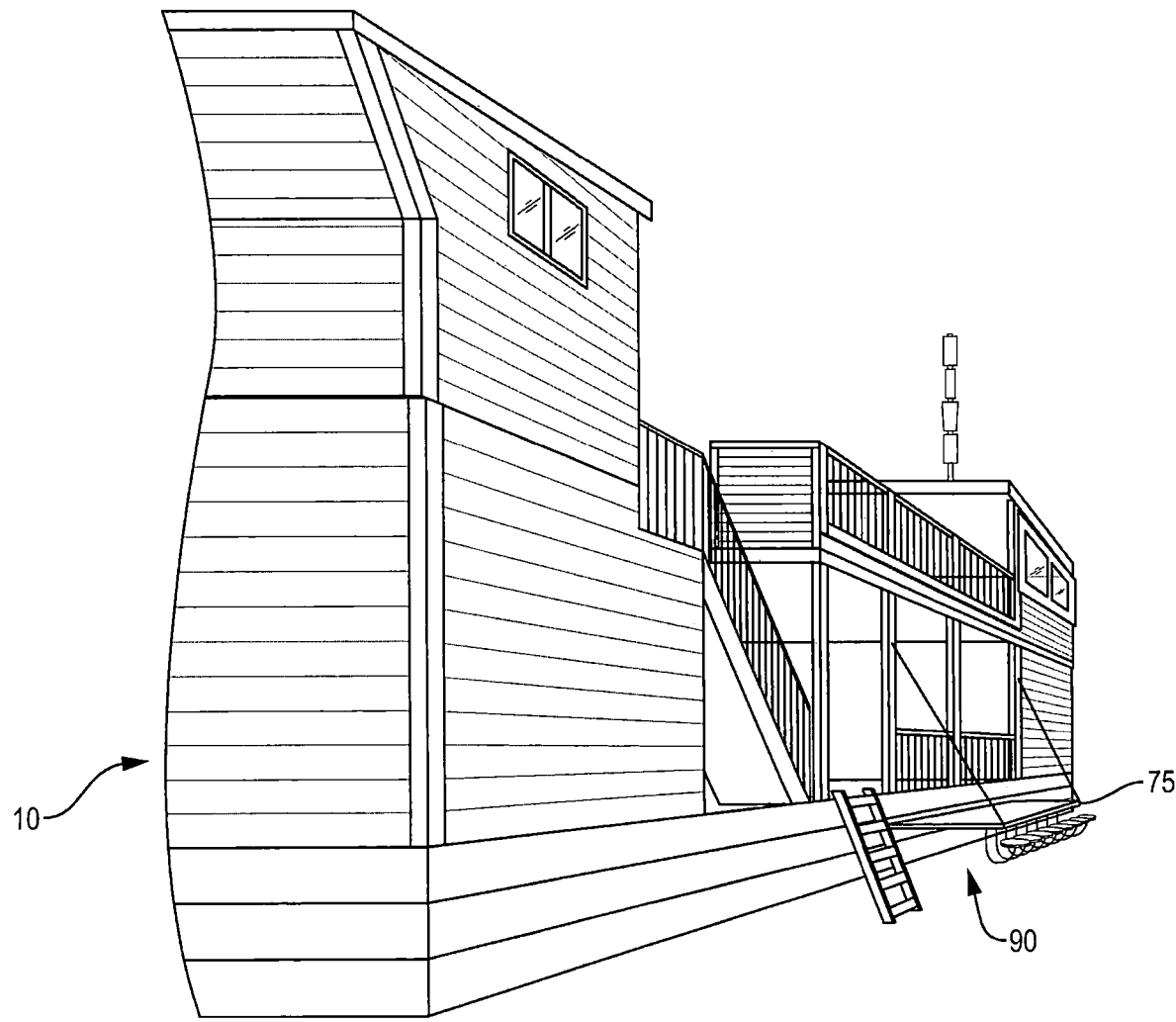
FIG. 8A is a side perspective view of one embodiment of the entertainment barge of the present invention showing the swim bar in a deployed position.
Figure 8B:
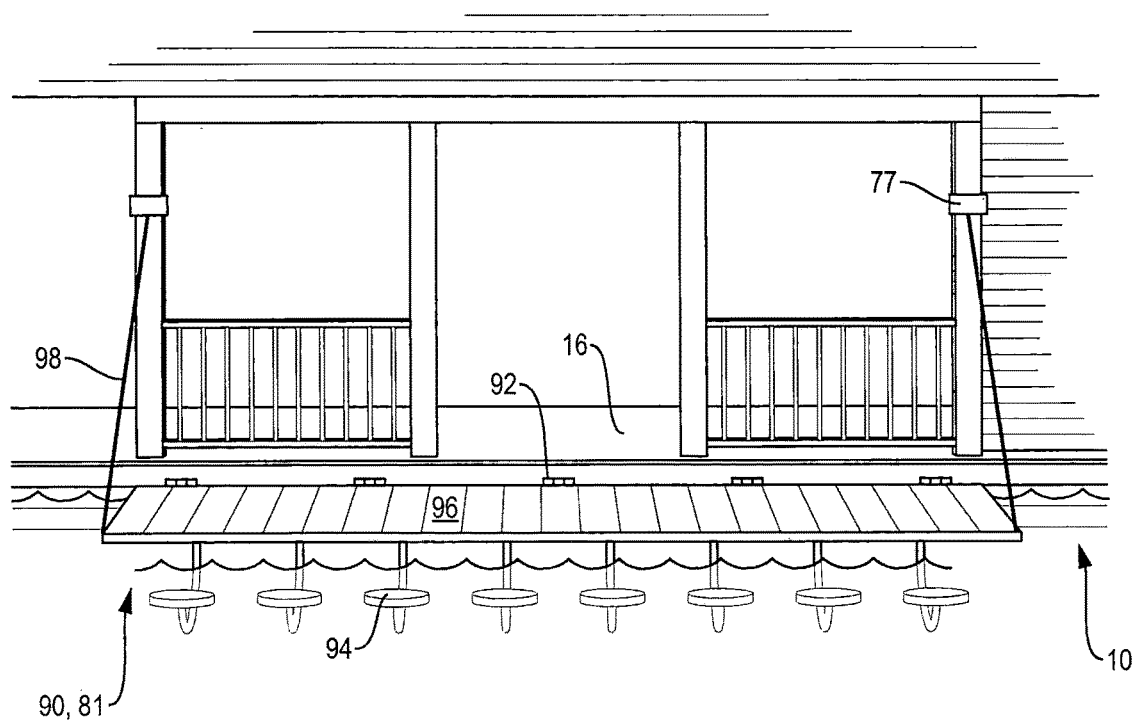
FIG. 8B is a side view of the swim bar of FIG. 8A.

Referring now to FIGS. 8A and 8B, the preferred entertainment barge 10 also includes a swim bar 90 rotatably mounted to the deck 16 using bar rotatable mounts 92, preferably sealed barrel type hinges, attached to one side of the first deck 16. The swim bar 90 includes a plurality of seats 94 and a bar surface 96 upon which patrons may rest their drinks. When secured at a desired location, the swim bar 90 is rotated downward into the water into downward position 81 and is preferably secured by two cables 98 that are sized to maintain the bar surface 96 in substantially parallel relation to the first deck 16. Cables 98 are part of motorized bar lift 77, that moves bar 90 between downward position 81 and upward position. Motorized bar lift 77 is preferably a hydraulic lift. When the entertainment barge 10 is to be moved from its location, the swim bar 90 is rotated upward out of the water into an upward position (not shown) and is secured in a manner similar to the swim ladders discussed above. Outer edge 75 of swim bar 90 when swim bar 90 is in downward position 81 is at least two feet away from outer edge 75 of swim bar 90 when swim bar 90 is in the upward position.

Although the present invention has been described in considerable detail with reference to certain preferred versions thereof, other versions would be readily apparent to those of ordinary skill in the art. Therefore, the spirit and scope of the appended claims should not be limited to the description of the preferred versions contained herein.

What is claimed is:

1. An entertainment barge comprising:
    a first deck with a top, bottom, front, rear, right side, and left side;
    at least two pontoons, wherein one of said at least two pontoons is attached to said bottom of said first deck proximate to said right side and another of said at least two pontoons is attached to said bottom of said first deck proximate to said left side;
    a second deck disposed above and parallel to said first deck;
    at least two retractable spuds attached to said first deck, wherein each of said at least two spuds is adjustable between a raised position and a fixed position, and wherein said at least two pontoons are independent of said at least two spuds;
    at least one propulsion motor attached to said rear of said first deck; and
    at least one swim ladder comprising:
        an inclined ladder portion comprising two struts, a plurality of stairs extending between said struts and a pair of deck braces extending from said struts, wherein said deck braces are shaped and dimensioned such they extend past one of said right side and said left side of said deck when the ladder is in a deployed position and secure the ladder to allow people to swim to the barge and climb up the ladder portion onto the top of the deck;
        at least one hand railing fixed to the ladder portion; and
        a pair rotating mounts attached to said deck braces and said top of said deck;
        wherein said swim ladder is shaped and dimensioned such that said at least one hand railing rests on said top of said first deck when said swim ladder is in a stored position.

2. The entertainment barge as claimed in claim 1, wherein each of said at least two retractable spuds comprises a winch that raises said spud into said raised position and lowers said spud into said fixed position.

3. An entertainment barge comprising:
    a first deck with a top, bottom, front, rear, right side, and left side;
    at least two pontoons, wherein one of said at least two pontoons is attached to said bottom of said first deck proximate to said right side and another of said at least two pontoons is attached to said bottom of said first deck proximate to said left side;
    a second deck disposed above and parallel to said first deck;
    at least two retractable spuds attached to said first deck, wherein each of said at least two spuds is adjustable between a raised position and a fixed position, and wherein said at least two pontoons are independent of said at least two spuds;
    at least one propulsion motor attached to said rear of said first deck; and
    a docking guide mounted on said front of said first deck, wherein said docking guide comprises a V-shaped notch that is shaped and dimensioned to engage with a docking post.

4. The entertainment barge as claimed in claim 1, further comprising a modular kitchen and at least one modular bathroom attached to said top of said first deck.

5. The entertainment barge as claimed in claim 4, wherein said modular kitchen comprises a drive-up window.

6. An entertainment barge comprising:
    a first deck with a top, bottom, front, rear, right side, and left side;
    at least two pontoons, wherein one of said at least two pontoons is attached to said bottom of said first deck proximate to said right side and another of said at least two pontoons is attached to said bottom of said first deck proximate to said left side;
    a second deck disposed above and parallel to said first deck;
    at least two retractable spuds attached to said first deck, wherein each of said at least two spuds is adjustable between a raised position and a fixed position, and wherein said at least two pontoons are independent of said at least two spuds;

at least one propulsion motor attached to said rear of said first deck; and a swim bar rotatably mounted to one of said right side and said left side of said first deck, wherein said swim bar is adjustable between a downward position and an upward position and comprises:
- a plurality of seats;
- a bar surface;
- at least one bar rotatable mount attached to said first deck and said bar surface; and
- securing means for securing said bar surface in substantially parallel relation to said first deck.

7. The entertainment barge as claimed in claim 1, further comprising at least one adjustment motor mounted to a corner of said first deck.

8. An entertainment barge comprising:
a first deck with a top, bottom, front, rear, right side, and left side;
at least two pontoons, wherein one of said at least two pontoons is attached to said bottom of said first deck proximate to said right side and another of said at least two pontoons is attached to said bottom of said first deck proximate to said left side;
a second deck disposed above and parallel to said first deck;
at least one propulsion motor attached to said rear of said first deck; and
a motor lift system comprising;
- a frame comprising a pair of vertical supports fixedly attached to the rear of said first deck, and an upper cross bar that extends between said vertical supports, wherein said vertical supports are each U-shaped and comprise an inward facing channel;
- a lower mounting bar shaped and dimensioned to fit within said channels of said vertical supports such that said lower mounting bar may move in a vertical direction but may not move in a horizontal direction and to allow said at least one propulsion motor to be mounted thereto; and
- a pair of hydraulic cylinders attached to said cross bar of said frame and said lower mounting bar in substantially parallel relation to said vertical supports;
- wherein said hydraulic cylinders are adapted to move said lower mounting bar vertically upward and downward within said vertical supports a distance of between two feet and four feet.

9. The entertainment barge as claimed in claim 8, further comprising a modular kitchen and at least one modular bathroom attached to said top of said first deck.

10. The entertainment barge as claimed in claim 9, wherein said modular kitchen comprises a drive-up window.

11. The entertainment barge as claimed in claim 3, wherein each of said at least two retractable spuds comprises a winch that raises said spud into said raised position and lowers said spud into said fixed position.

12. The entertainment barge as claimed in claim 3, further comprising a modular kitchen and at least one modular bathroom attached to said top of said first deck.

13. The entertainment barge as claimed in claim 12, wherein said modular kitchen comprises a drive-up window.

14. The entertainment barge as claimed in claim 3, further comprising at least one adjustment motor mounted to a corner of said first deck.

15. The entertainment barge as claimed in claim 6, wherein each of said at least two retractable spuds comprises a winch that raises said spud into said raised position and lowers said spud into said fixed position.

16. The entertainment barge as claimed in claim 6, further comprising a modular kitchen and at least one modular bathroom attached to said top of said first deck.

17. The entertainment barge as claimed in claim 16, wherein said modular kitchen comprises a drive-up window.

18. The entertainment barge as claimed in claim 6, further comprising at least one adjustment motor mounted to a corner of said first deck.

19. The entertainment barge as claimed in claim 8, further comprising at least one adjustment motor mounted on a corner of said first deck.

20. The entertainment barge as claimed in claim 8, further comprising at least one swim ladder comprising:
- an inclined ladder portion comprising two struts, a plurality of stairs extending between said struts and a pair of deck braces extending from said struts, wherein said deck braces are shaped and dimensioned such they extend past one of said right side and said left side of said deck when the ladder is in a deployed position and secure the ladder to allow people to swim to the barge and climb up the ladder portion onto the top of the deck;
- at least one hand railing fixed to the ladder portion; and
- a pair rotating mounts attached to said deck braces and said top of said deck;
- wherein said swim ladder is shaped and dimensioned such that said at least one hand railing rests on said top of said first deck when said swim ladder is in a stored position.

21. The entertainment barge as claimed in claim 8, further comprising a docking guide mounted on said front of said first deck, wherein said docking guide comprises a V-shaped notch that is shaped and dimensioned to engage with a docking post.

22. The entertainment barge as claimed in claim 8, further comprising a swim bar rotatably mounted to one of said right side and said left side of said first deck, wherein said swim bar is adjustable between a downward position and an upward position and comprises:
- a plurality of seats;
- a bar surface;
- at least one bar rotatable mount attached to said first deck and said bar surface; and
- securing means for securing said bar surface in substantially parallel relation to said first deck.

* * * * *